United States Patent [19]

Wakabayashi

[11] Patent Number: 5,092,822
[45] Date of Patent: Mar. 3, 1992

[54] LOW-NOISE CHAIN AND CHAIN POWER TRANSMISSION APPARATUS USING THE LOW-NOISE CHAIN

[75] Inventor: Shozo Wakabayashi, Hirakata, Japan

[73] Assignee: Borg-Warner Automotive K.K., Mie, Japan

[21] Appl. No.: 654,776

[22] Filed: Feb. 13, 1991

[30] Foreign Application Priority Data

Jun. 25, 1990 [JP] Japan .................................. 2-166200

[51] Int. Cl.⁵ ............................................. F16G 13/02
[52] U.S. Cl. .................................... 474/209; 474/212
[58] Field of Search ............... 474/206, 209, 212, 229; 59/4, 84

[56] References Cited

U.S. PATENT DOCUMENTS

| 624,492 | 5/1899 | Hoffmann | 474/209 |
| 663,352 | 12/1900 | Morse | 474/229 |
| 799,074 | 9/1905 | Morse | 474/229 |
| 2,061,223 | 11/1936 | Cunningham et al. | 474/209 X |

Primary Examiner—Thuy M. Bui

[57] ABSTRACT

A low-noise chain preventing a roller or a bushing from contacting a bottom portion of a sprocket thus reducing impact noise. The low-noise chain includes pairs of inner link plates and pairs of outer link plates alternately lined up with each other, each of the link plates having two insertion holes; connecting pins inserted into the insertion holes of the link plates to couple the inner and the outer link plate; and bushing or rollers disposed around the connecting pin. The roller or bushing has a substantially triangular configuration in transverse cross section and has three intermeshing surfaces on its outer circumference.

16 Claims, 7 Drawing Sheets

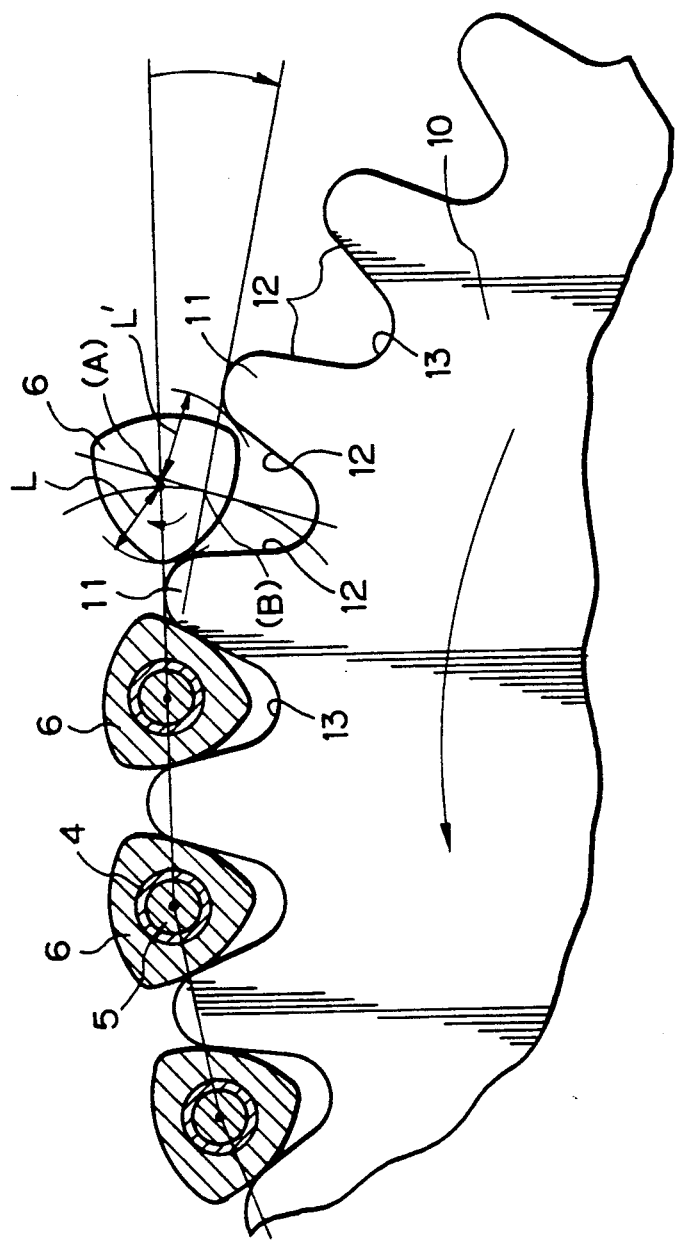

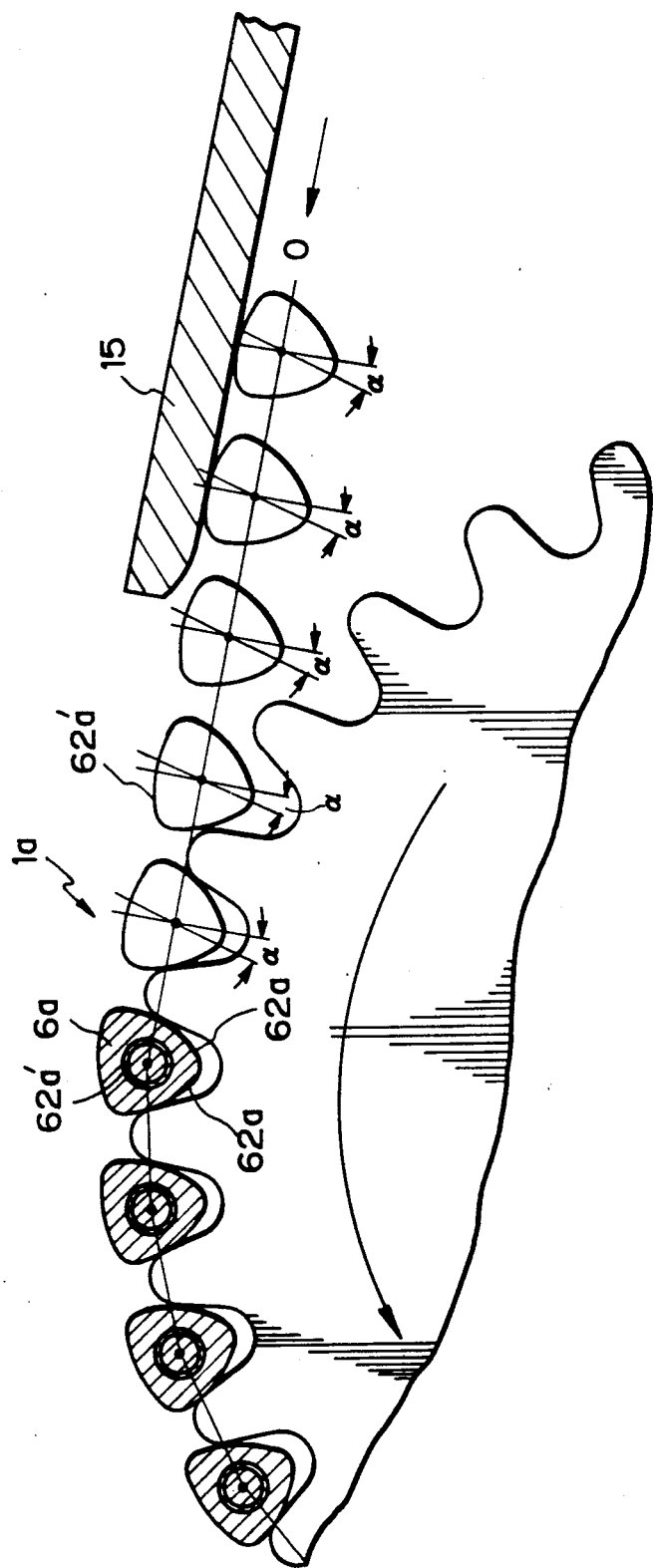

LOW-NOISE CHAIN AND CHAIN POWER TRANSMISSION APPARATUS USING THE LOW-NOISE CHAIN

BACKGROUND OF THE INVENTION

1. Field of the Invention

The present invention relates to a low-noise chain and a chain power transmission apparatus using the low-noise chain, and more particularly, to both roller and bushed type chains in which rollers do not collide with a bottom portion or surface of a sprocket, and also to a chain power transmission apparatus.

2. Prior Art

As shown in FIG. 15A conventional roller type and bushed type chains has rollers that collide with bottom portions or surfaces f between pairs of adjacent teeth e of a sprocket d as when the chain meshes with the sprocket. The rollers collide with the respective bottom portions at a right angle direction to a tangential line of the bottom portions as is clear from FIG. 15. Thus high impact noise is generated when collision between the roller or bush and the bottom portion occurs. Moreover, the higher the rotational speed of the sprocket is the greater is the collision speed between the roller or bush and the bottom portion and the subsequent impact noise. When this impact noise is continuously generated under high speed, it causes intermeshing noise having a constant frequency under a certain rotational speed of the sprocket.

SUMMARY OF THE INVENTION

It is a principal object of the present invention to provide a roller chain in which each roller has a contour of a substantially triangular configuration having three meshing surfaces, and in which any two of these three meshing surfaces may mesh only with teeth of a sprocket thereby reducing the aforementioned impact noise.

It is another object of the present invention to provide a bushed chain in which each of the rollers thereof has a contour of a substantially triangular configuration with three meshing surfaces and in which any two of these three meshing surfaces may be meshed with teeth of a sprocket to reduce the aforementioned impact noise.

It is a further object of the present invention to provide a chain power transmission apparatus in which each of the rollers thereof has a contour of a substantially triangular configuration having three meshing surfaces and in which two of these three meshing surfaces are meshed with teeth of a sprocket, and the roller is forced to rotate against a drag applied thereto when they mesh with the roller and the teeth to reduce the aforementioned impact noise.

The present invention provides a low-noise chain including pairs of inner link plates and pairs of outer link plates alternately lined up with each other, each of said link plates having two insertion holes; bushes fitted into said insertion holes of said inner plates to be fixed thereto; and connecting pins inserted into said bushes and said insertion holes of said outer link plates, whereby said pairs of inner and outer link plates are pivotably jointed to each other along a longitudinal direction; said low-noise chain being characterized in that a roller having three intermeshing surfaces on its outer circumference is rotatably disposed around each of said bushes; and that said roller is substantially a triangle having three tip portions in transverse cross section.

The present invention also provides a low-noise chain including pairs of inner link plates and pairs of outer link plates alternately lined up with each other, each of said link plates having two insertion holes; and connecting pins inserted into said insertion holes of said outer link plates, whereby said pairs of inner and outer link plates are pivotably joined to each other in a longitudinal direction; said low-noise chain being characterized by rollers on said pins, each roller having a circumferential contour that in transverse cross section is substantially a triangle having three tip portions; and that meshing surfaces each extending between any two of said three top portions are formed on the circumferential surface of said bush.

The present invention further provides a chain power transmission apparatus comprising a chain including pairs of inner link plates and pairs of outer link plates alternately lined up with each other each of said link plates having two insertion holes, bushings fitted into said insertion holes of said inner plates to be fixed thereto, and connecting pins inserted into said bushing and said insertion holes of said outer link plates, said pairs of inner and outer link plates being pivotably joined to each other in a longitudinal direction; and a sprocket meshing with said chain, said chain power transmission apparatus being characterized in that a roller having three meshing surfaces on its outer circumference is rotatably disposed around each of said bushings; that said roller is substantially a triangle having three tip portions in transverse cross section; that frictional drag is applied to said roller against the rotation thereof with respect to said bush; that one of said meshing surfaces is inclined through a predetermined angle substantially entirely relative to a line connecting said top portions positioned at both ends of said meshing surface; and that a guide member which engages with said rollers of said chain so as to orientate said rollers in a predetermined direction prior to being entrained by said sprocket.

In the chain and apparatus having the above described structure, when the low-noise chain meshes with the sprocket any two of three meshing surfaces of the rollers engage or mesh with intermeshing surfaces of adjacent teeth of the sprocket and accordingly do not collide with the bottom portion or surface of the sprocket. Moreover, the meshing surfaces of the rollers engage with the intermeshing surfaces such that the former slide on the latter with the angle between the direction of movement of the rollers and the intermeshing surface being very small. Thus impact noise is reduced when the chain meshes with the teeth of the sprocket.

Since the roller is forced to rotate against the frictional drag mechanical shock is absorbed and noise is reduced when the chain meshes with the sprocket.

BRIEF DESCRIPTION OF THE DRAWINGS

For a more complete understanding of this invention, reference should now be made to the embodiments illustrated in greater detail in the accompanying drawings and described by way of example only. In the drawings:

FIG. 4 shows diagrammatically an intermeshing state between the roller and teeth of a sprocket;

FIGS. 5 to 7A and 7B illustrate an intermeshing state between the roller chain and the sprocket shown in FIG. 1;

FIG. 10 shows a guide element for the roller chain shown in FIG. 9;

DETAILED DESCRIPTION OF THE PREFERRED EMBODIMENTS

Figure 1:
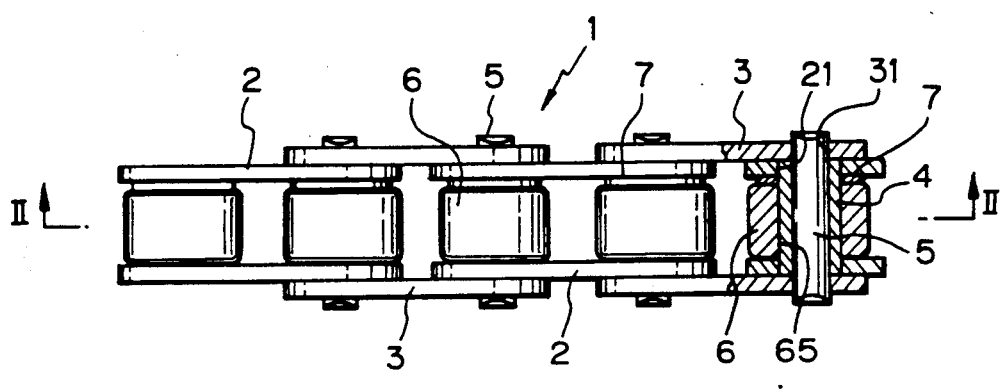
FIG. 1 is a top plan view of a part of one embodiment of the roller chain according to the present invention.

Referring more particularly to the disclosure in the drawings wherein are shown illustrative embodiments of the present invention, FIGS. 1–3B disclose one embodiment of a roller chain 1. In those figures, reference numeral 2 denotes an inside link plate, reference numeral 3 denotes an outside link plate, reference numeral 4 denotes a bushing fitted and fixed into insertion holes 21 of a pair of the inside link plates 2, reference numeral 5 denotes a connecting pin rotatably inserted within the bushing 4 and fitted into insertion holes 31 of the outside link plates 3 at the opposite ends thereof, and reference numeral 6 denotes a roller rotatably disposed around the bushing 4.

Figure 2:
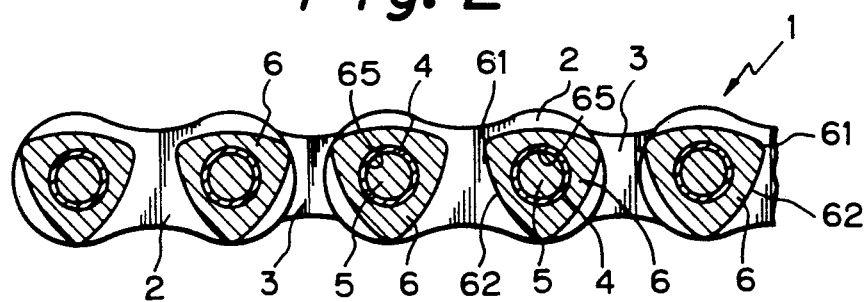
FIG. 2 is a cross sectional view taken along line II—II in FIG. 1.
Figure 3A:
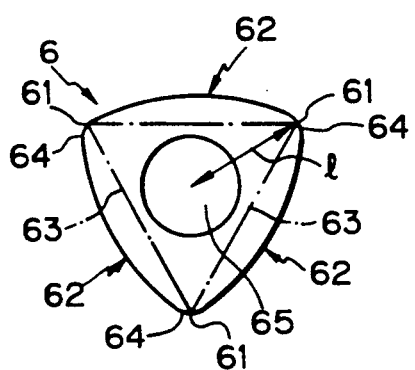
FIG. 3A is an enlarged end view of the roller.
Figure 3B:
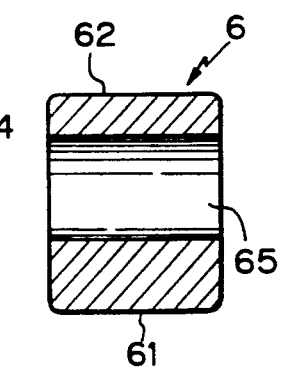
FIG. 3B is a sectional view of the roller shown in FIG. 3A.
Figure 3C:
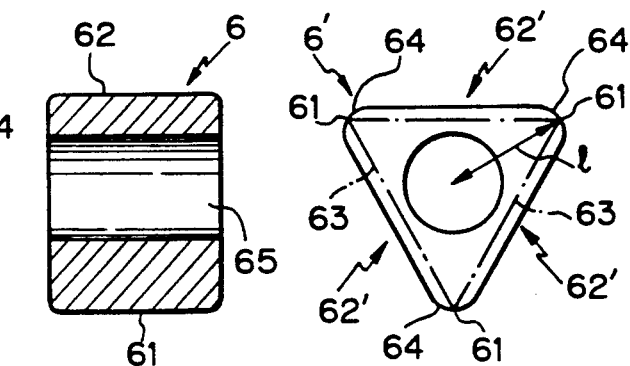
FIG. 3C is an enlarged end view of a modified form of the roller.

According to the present invention the circumferential contour of the roller 6 is substantially an equilateral triangle in transverse cross section as is clear from FIGS. 2 and 3. Namely the roller 6 includes three tip portions 64 each of which is defined by a curved surface having a relatively small radius of curvature, which surface passes through an apex 61 of the equilateral triangle, and three meshing surfaces 62 extending between any two of the three top portions, each of said meshing surfaces 62, in this embodiment, arcuately protrudes outwardly of a line 63 connecting any two of the top portions 64. It is easy for those skilled in the art to understand that the meshing surface 62 may be defined by a plane surface parallel to the line 63 as shown in FIG. 3C or by a plane surface including the line 63. The bushing 4 extends through an axially extending through hole 65 in the roller 6.

Figure 5:
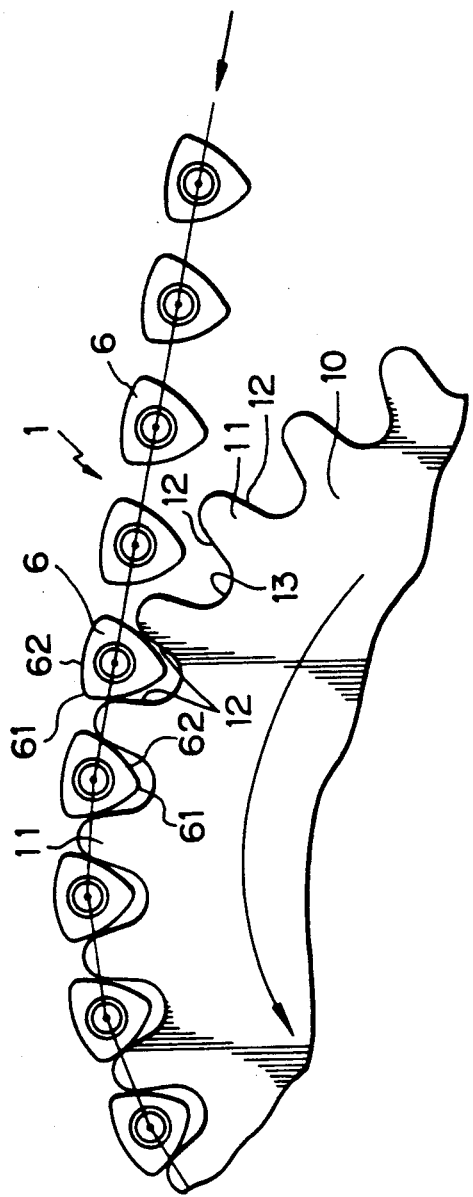
Figure 6:
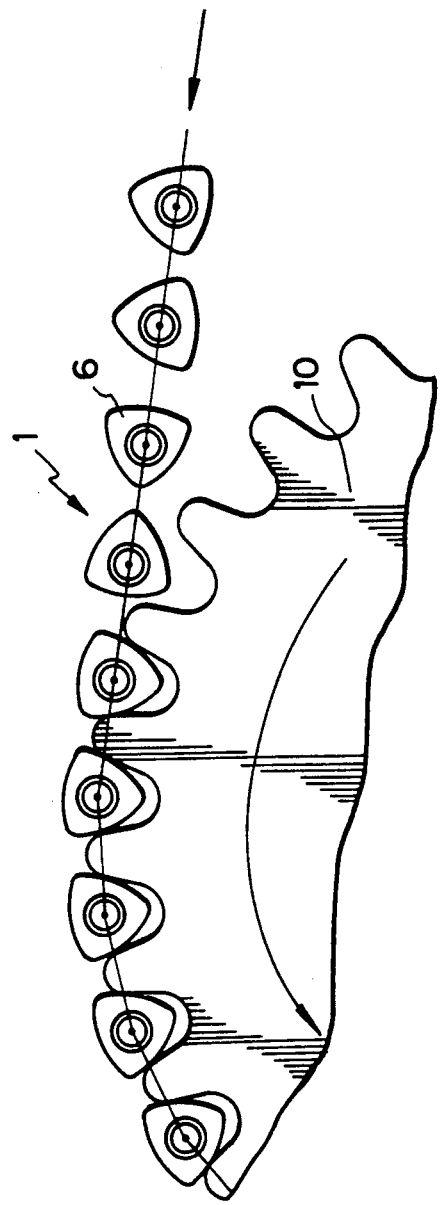

It should be noted that in order for the roller of the roller chain 1 to appropriately mesh with teeth of a sprocket to transmit power, the tooth configuration and the size of the roller are determined to satisfy the condition designated by the following equation:

$$l > L,\ l < L'$$

wherein $l$ is the distance between the center of rotation of the roller 6 and the apex 61 of the equilateral triangle through which the curved surface defining the top portion 64 of the roller extends, L is the shortest distance between the center of rotation of the roller 6 and the intermeshing surface of the tooth 11 of the sprocket 10 on a leading side when the center of rotation is in the position (A) shown in FIG. 4, and L' is the shortest distance between the center of rotation of the roller and the intermeshing surface of the tooth 11 on a trailing side in FIGS. 4 and 5. The intermeshing surface of the tooth 11 of the sprocket 10 may be defined by an arcuate surface, a plain surface or surface of an involute curve if the condition as mentioned above is satisfied and a part of the roller 6 (particularly the tip portion) does not come into contact with a bottom portion or surface 13 of the sprocket, the tooth contour being important only to assure that the roller 6 does not contact the valley area indicated generally at 13 in FIG. 4.

A friction member 7 is provided between the surface of one link plate 2 (upside in this embodiment) and the roller 6. This friction member may be a disc spring, spring washer, O-ring or the like, if it is elastically deformable to be compressed between the inside of the link plate 2 and the roller 6 for applying a rotational friction drag to the roller 6 for the life of the chain. Although the friction member 7 is provided at one side of the roller in this embodiment, it may be provided at opposite sides or at both sides of the roller, respectively. Moreover, the friction member may be omitted.

When the roller chain 1 having the structure as described above is used with the sprocket, the power is transmitted between the roller chain 1 and the sprocket with any two of the three meshing surfaces 62 of the roller 6 engaging with the intermeshing surface 12 of two adjacent teeth 11 of the sprocket 10, but the tip portion 64 of the roller 6 does not collide or come into contact with the bottom portion 13 of the sprocket, as shown in FIG. 5. Thus collision between the roller and the bottom portion will not occur and the roller 6 will engage with the intermeshing surfaces of the teeth so that the meshing surface 62 of the roller slides on the intermeshing surface 12, with the angle between the direction of movement of the roller and the intermeshing surface being kept very small. This results in a reduction in impact noise.

Figure 7A:
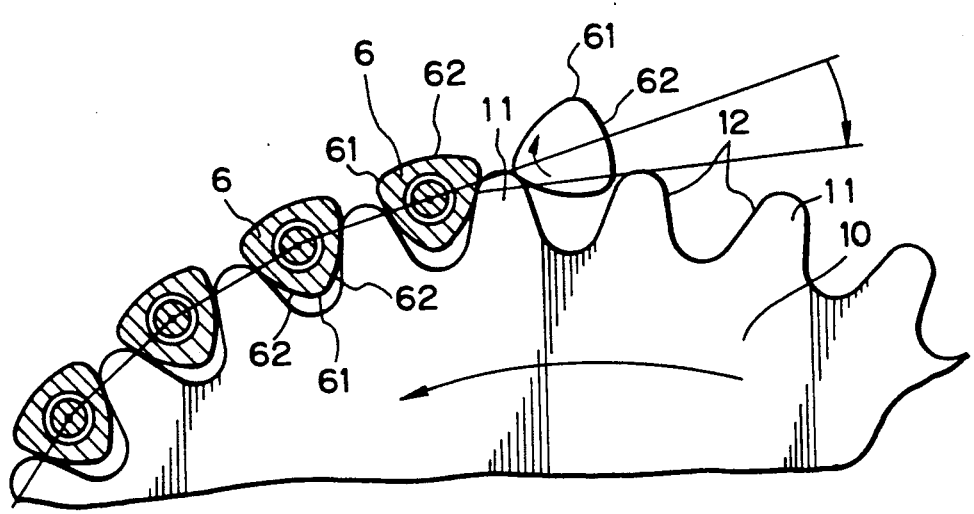
Figure 7B:
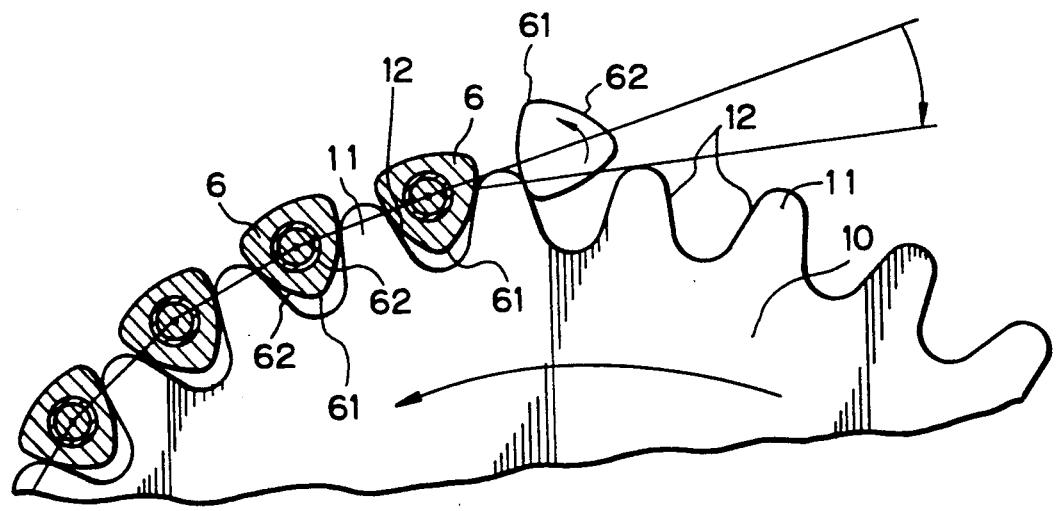

Moreover, when the roller chain 1 meshes with the sprocket 10, if the condition described herein before is satisfied, the roller 6 rotates in either direction by contacting with a part of the tooth 11 of the sprocket as shown in FIGS. 7A and 7B, so that the roller regularly meshes with the teeth of the sprocket regularly with two of the three meshing surfaces 62 engaging with the intermeshing surfaces 11 of the teeth, even when the roller comes to a position between the adjacent teeth of the sprocket with various angular orientations thereof being present due to vibration in the span of the chain, or interference between the roller and a tensioner.

The fact that the roller comes into mesh with the sprocket from the above described irregular position is desirable for the roller chain since it disturbs a cyclic phenomena of intermeshing shock and prevents a spectrum of impact noise having a peak value to thus retain generation of undesirable noise. In the roller chain including the friction member 7 as illustrated in this embodiment it is difficult for the angular position of the roller to adopt an irregular orientation. However, in such a case it is possible to make the roller adopt an irregular position by providing means between a driving sprocket and a driven sprocket which irregularly moves to contact with the roller chain.

Figure 8:
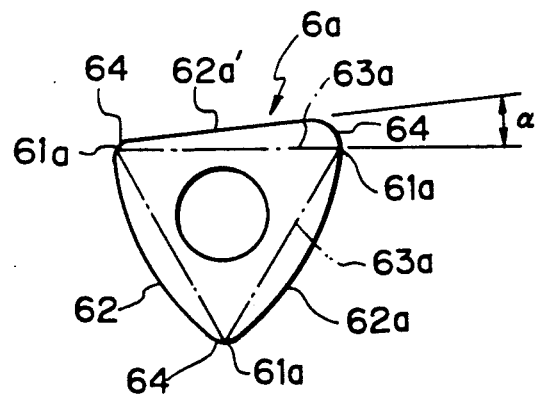
FIG. 8 an enlarged end view showing a modified form of the roller.
Figure 9:
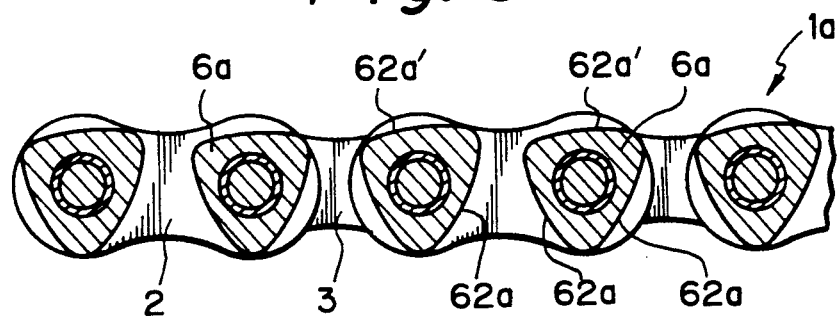
FIG. 9 is a cross sectional view of a part of roller chain using the roller shown in FIG. 8.
Figure 11:
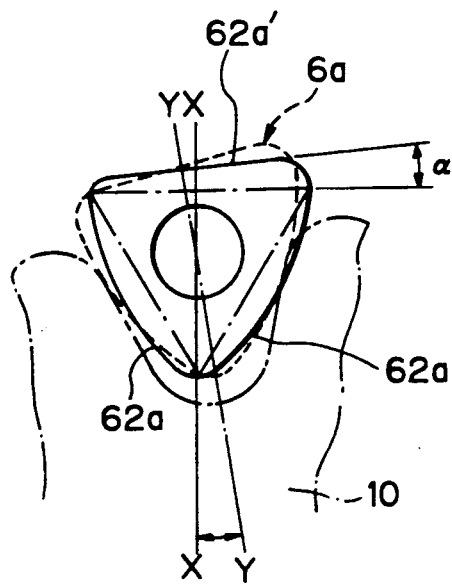
FIG. 11 illustrates the condition in which the roller is intermeshing with the sprocket.

A modified embodiment of a roller 6a is shown in FIGS. 8 and 9. The circumferential contour of this roller 6a is somewhat distorted in comparison with the former embodiment. Namely, one meshing surfaces 62a' is distorted in comparison with the other two meshing surface 62a as clearly shown in FIG. 8. The roller 6a of this embodiment is different from that of the former embodiment in that the meshing surface 62a' is defined by a plane surface inclined at an angle α with respect to the line 63a connecting the apexes 61a of an equilateral triangle in transverse cross section of the roller, which triangle composes the essential configuration of the roller. A roller chain 1a including a plurality of rollers 6a is adapted to be used with a chain guide 15 such as shown in FIG. 10. Namely, when the roller chain 1a meshes with the sprocket, the roller comes to a position between adjacent teeth where it meshes with the teeth of the sprocket with the center line X—X (the line passing through the apex between two meshing surfaces having the same configuration and the center of rotation of the roller) being inclined at an angle α with respect to center line Y—Y (the line passing through the midpoint between adjacent two teeth of the sprocket and the center of rotation of the sprocket) of the bottom portion of the sprocket as shown in FIG. 11, if the meshing surface is guided by the chain guide 15 such that it is parallel with the line O—O passing through the center of the rollers. Due to the reason described above, the roller 6a is forced to rotate at an angle α (when the meshing surfaces 62a regularly mesh with the intermeshing surfaces of the teeth the line X—X coincide with the line Y—Y) in order for the two meshing surfaces to regularly mesh with the teeth. Therefore, shock is absorbed through a rotational friction drag to decrease the impact noise when the roller and the teeth engage if the friction drag is applied to the roller.

Figure 12:
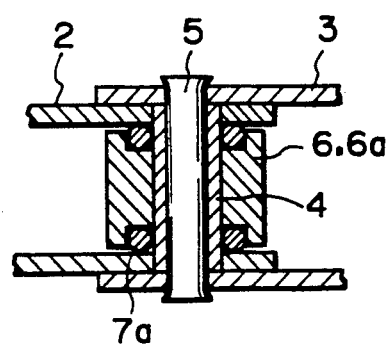
FIG. 12 is a sectional view showing a modified form of means for producing a frictional drag against the rotation of the roller.

Elastically deformable friction member 7a which is compressed between the roller 6 or 6a and the bush 4 to apply the friction drag to the roller after it has worn out may be provided between the roller and the bush as shown in FIG. 12 as means for applying a frictional drag against the rotation of the roller 6 or 6a in place of the means as described above.

Figure 13:
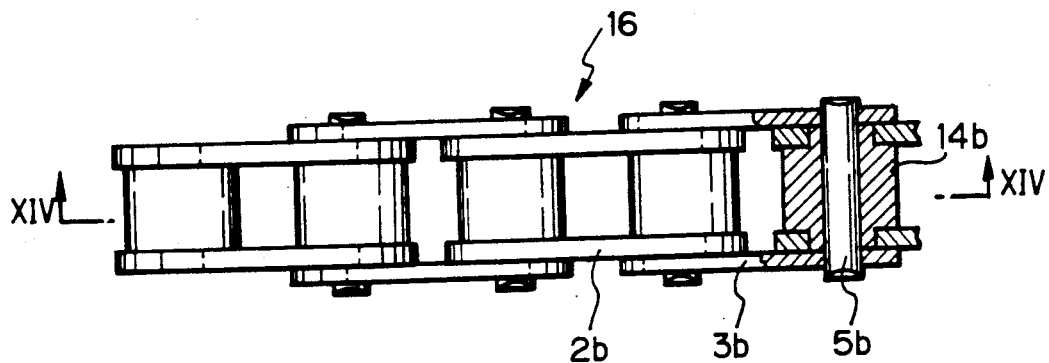
FIG. 13 shows a part of a modified roller chain according to the present invention in cross section.
Figure 14:
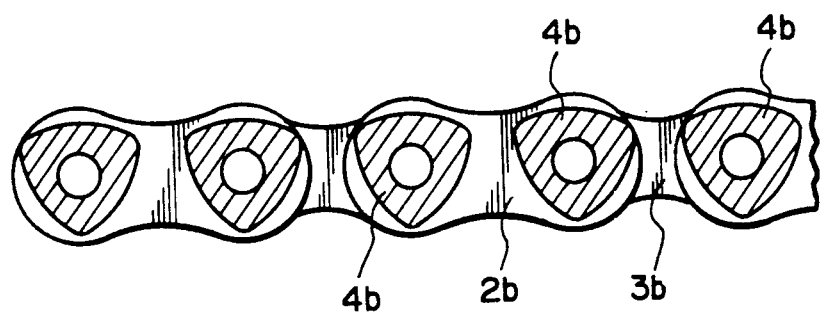
FIG. 14 is a cross sectional view taken along line XIV—XIV.
Figure 15:
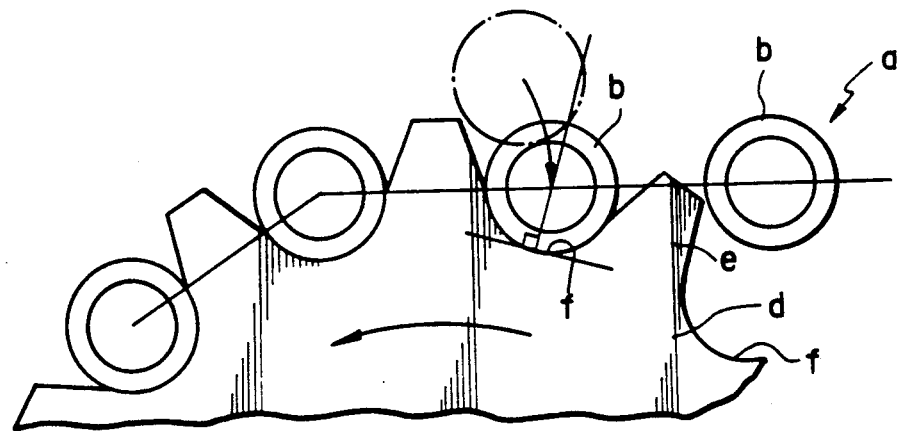
FIG. 15 shows the intermeshing condition of a roller chain of a prior art.

In FIGS. 13 and 14 a roller chain 1b of alternative construction according to the present embodiment is disclosed. In this chain 1b the circumferential contour of the roller 4b fixed to the inside link plates 2b is not circular in transverse cross section but is generally triangular as is the roller shown in FIG. 3. The triangular configuration of this roller 4b in transverse cross section is substantially the same as the triangular configuration of the roller 6 of the roller chain 1 shown in FIGS. 1 to 3. Therefore, detailed description of the triangular configuration is omitted.

According to the present invention impact noise is reduced when the roller meshes with the sprocket thereby reducing undesirable noise since the two meshing surfaces of the roller engage with the intermeshing surfaces of the teeth of the sprocket. In addition, shock is absorbed by applying rotational drag to the roller.

Moreover, according to the chain power transmission apparatus of the present invention shock is absorbed through the drag thereby reducing noise since the roller is forced to rotate when the roller chain meshes with the sprocket by orientating the roller in a predetermined direction.

Although the best mode contemplated by the inventor for carrying out the present invention has been shown and described herein, it will be apparent to those skilled in the art that suitable modifications, variations and equivalents may be made without departing from the scope of the invention, such scope being limited solely by the terms of the following claims.

What is claimed is:

1. A low-noise chain including pairs of inner link plates and pairs of outer link plates alternatively lined up with each other, each of said link plates having two insertion holes; bushings fitted into said insertion holes of said inner plates to be fixed thereto; and connecting pins inserted into said bushings and said insertion holes of said outer link plates, whereby said pairs of inner and outer link plates are pivotably joined to each other in a longitudinal direction; said low-noise chain being characterized by rollers rotatably mounted on said bushings and in that each roller has three meshing surfaces on its outer circumference; and that each said roller is substantially triangular having three tip portions, each said meshing surface between two of said three tip portions.

2. A low-noise chain as set forth in claim 1, wherein each of said meshing surfaces is convex and arcuately protrudes outwardly of a line connecting any two of said tip portions.

3. A low noise chain as set forth in claim 2 wherein each said tip portions is defined by an arcuately curved surface having a radius of curvature that is small relative to said convex surface radius of curvature.

4. A low noise chain as set forth in claim 3, wherein an elastically deformable member for applying rotational frictional drag to said roller is disposed between said link plate and said roller.

5. A low noise chain as set forth in claim 1 wherein an elastically deformable member for applying rotational friction drag to said roller is disposed between said bush and said roller.

6. A low noise chain as set forth in claim 5, wherein one of said meshing surfaces is defined in part by a plane surface which is inclined through a predetermined angle along substantially the length of a line connecting said tip portions.

7. A low-noise chain as set forth in claim 1, wherein each of said meshing surfaces is defined at least in part by a plane surface intermediate two of said tip portions.

8. A low noise chain as set forth in claim 7, wherein each of said meshing surfaces is defined at least in part by a plane surface intermediate two of said tip portions, which tip portions are defined by an arcuately curved surface of relatively small radius of curvature.

9. A low noise chain as set forth in claim 1 wherein an elastically deformable member for applying rotational friction drag to said roller is disposed between said link plate and said roller.

10. A low noise chain as set forth in claim 9, wherein one of said meshing surfaces is defined in part by a plane surface which is inclined through a predetermined angle along substantially the length of a line connecting said tip portions.

11. A low noise chain including pairs of inner link plates and pairs of outer link plates alternately lined up with each other, each of said link plates having two insertion holes; connecting pins inserted into said insertion holes of said outer link plates, said pairs of inner and outer link plates are pivotably joined to each other in a longitudinal direction; said low-noise chain being characterized by rollers rotatably mounted on said pins, said rollers having a circumferential contour in transverse cross section that is substantially triangular having three meshing surfaces and three tip portions; said surfaces each extending between two of said three tip portions and being of arcuate convex contour.

12. A low noise chain as set forth in claim 11, wherein each of said meshing protrudes arcuately outwardly of a line connecting any two of said tip portions.

13. A low noise chain as set forth in claim 11 wherein each of said tip portions is defined by an arcuately curved surface having a relatively small radius of curvature relative to said arcuate convex contour of said meshing surfaces.

14. A chain power transmission apparatus comprising a chain including pairs of inner link plates and pairs of outer link plates alternately lined up with each other, each of said link plates having two insertion holes, bushings fitted into said insertion holes of said inner plates and fixed thereto, and connecting pins inserted into said bushings and said insertion holes of said outer link plates, whereby said pairs of inner and outer link plates are pivotably joined to each other in a longitudinal direction; and a sprocket meshing with said chain, said chain power transmission apparatus being characterized in that a roller having three meshing surfaces on its outer circumference is rotatably disposed around each of said bushings, that said roller is substantially triangular having three tip portions in transverse cross section; frictional drag elements alongside said rollers to impede the rotation thereof with respect to said bushings; that one of said meshing surfaces is inclined through a predetermined angle substantially entirely relative to a line connecting said tip portions positioned at both ends of said meshing surface; and that a guide member is so located relative to said sprocket that it engages with said rollers of said chain so as to arrange the orientation of said rollers in a predetermined direction as the rollers are engaged by the teeth of said sprocket.

15. A chain power transmission apparatus as set forth in claim 14, wherein said friction element positioned between said link plate and said roller and being elastically deformable.

16. A chain power transmission apparatus as set forth in claim 14, wherein said friction element positioned between said bush and said roller and being elastically deformable.

* * * * *